United States Patent

Seki

[11] Patent Number: 5,841,371
[45] Date of Patent: Nov. 24, 1998

[54] ENCODER SIGNAL GENERATING DEVICE

[75] Inventor: Shigeo Seki, Iida, Japan

[73] Assignee: Tamagawa Seiki Kabushiki Kaisha, Nagano-ken, Japan

[21] Appl. No.: 808,646

[22] Filed: Feb. 28, 1997

[30] Foreign Application Priority Data

Dec. 17, 1996 [JP] Japan .................................. 8-337139

[51] Int. Cl.⁶ .................................................. H03M 1/22
[52] U.S. Cl. .................................................. 341/13; 341/1
[58] Field of Search .......................................... 341/13, 1

[56] References Cited

U.S. PATENT DOCUMENTS

| | | | |
|---|---|---|---|
| 4,604,521 | 8/1986 | Takeokoshi et al. | 250/231 SE |
| 4,661,696 | 4/1987 | Stone | 250/231 SE |
| 4,975,569 | 12/1990 | Ebina et al. | 250/231.16 |

*Primary Examiner*—Brian K. Young
*Assistant Examiner*—Jason L W Kost
*Attorney, Agent, or Firm*—Sughrue, Mion, Zinn, Macpeak & Seas, PLLC

[57] ABSTRACT

An encoder signal generating device in which a light receiving element (1) is constituted by a one-chip planar type phototransistor array that has a plurality of light receiving portions (21). Thus, this encoder signal generating device needs no amplification circuit. Even when using this encoder signal generating device as a device of the multi-channel type, the size of the light receiving element (1) is reduced, in comparison with that of a conventional light receiving element. Moreover, a highly sensitive encoder signal generating device, which has good S/N characteristics, is obtained.

1 Claim, 3 Drawing Sheets

(A–A' CROSS SECTIONAL VIEW)

ENCODER SIGNAL GENERATING DEVICE

BACKGROUND OF THE INVENTION

1. Field of the Invention

The present invention generally relates to an encoder signal generating device and, more particularly, to a novel improvement for obtaining a highly sensitive miniaturized encoder signal generating device, which has good S/N characteristics, by using a one-chip planar type phototransistor array.

2. Description of the Related Art

Generally, the light receiving elements (namely, the photoreceptors) of conventional encoders have employed the configuration of FIG. 1, similarly as in the case of the light receiving element of the encoder, which is disclosed in Japanese Unexamined Patent Publication No. 62-278408 Official Gazette. Namely, in the case of the light receiving element 1 of FIG. 1, planar type photodiodes 2 are connected to operational amplifiers 3, respectively. Further, encoder signals are outputted therefrom through a comparison circuit 4.

Conventional encoder-signal generating devices have the aforementioned configuration. Thus, there are caused the following problems. Namely, in the case of using a planar photodiode as a light receiving element, when reducing the widths of optical slits, which serve as codes, in order to enhance the resolution thereof, the quantity of light supplied to the light receiving element decreases. This conventional encoder-signal generating device, therefore, needs an amplification circuit illustrated in FIG. 1. Further, in the case of using a light receiving element for a multi-channel absolute encoder, the size of the light receiving element itself should be large. This goes against demands for miniaturization of a signal generating device.

The present invention is accomplished to solve the aforementioned problems. In particular, an object of the present invention is to provide a highly sensitive miniaturized encoder signal generating device, which has good S/N characteristics, by using a one-chip planar type phototransistor array.

SUMMARY OF THE INVENTION

To achieve the foregoing object, in accordance with the present invention, there is provided an encoder signal generating device adapted so that light emitted from a light emitting element is applied to a light receiving element through a code portion representing a code, which is formed on a rotary code plate, and that an encoder signal is obtained from the aforesaid light receiving element. In this encoder signal generating device, the light receiving element is constituted by a one-chip planar type phototransistor that has a plurality of light receiving portions.

More particularly, in the case of an embodiment of the encoder signal generating device of the present invention, a light blocking portion made of aluminum is formed on the periphery of each of the aforesaid light receiving portions.

Further particularly, in the case of another embodiment of the encoder signal generating device of the present invention, the aforesaid code portion has an absolute code section that is formed in a multi-channel manner. The aforesaid light receiving element has the light receiving portions of a number which is equal to the number of channels corresponding to the aforesaid absolute code section.

With the aforementioned configuration, the encoder signal generating device of the present invention has the following advantages (or effects). Namely, because the light receiving element is constituted by a one-chip planar type phototransistor array, the sensitivity of the device is high. Moreover, differently from the conventional device, it is unnecessary for the encoder signal generating device of the present invention to connect the amplification circuit with the photodiode. Thereby, the configuration of the circuit is simplified. Further, the size of the chip of the device of the present invention is smaller than that of the chip of the conventional device. Furthermore, the improvement of the S/N (namely, the signal-to-noise ratio) is attained.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DESCRIPTION OF THE PREFERRED EMBODIMENT

Figure 1:
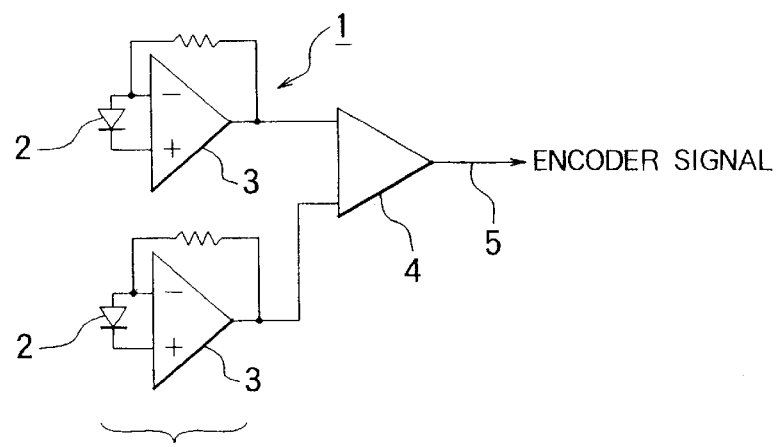
FIG. 1 is a circuit diagram illustrating the conventional light receiving element.

Hereinafter, the preferred embodiment of the present invention will be described in detail by referring to the accompanying drawings. Incidentally, same reference characters designate same or corresponding parts of the conventional device.

Figure 2:
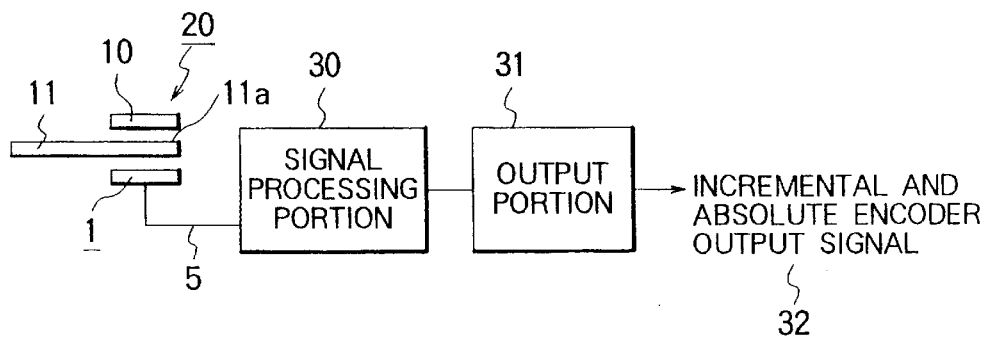
FIG. 2 is a block diagram illustrating an encoder signal generating device according to the present invention.
Figure 3:
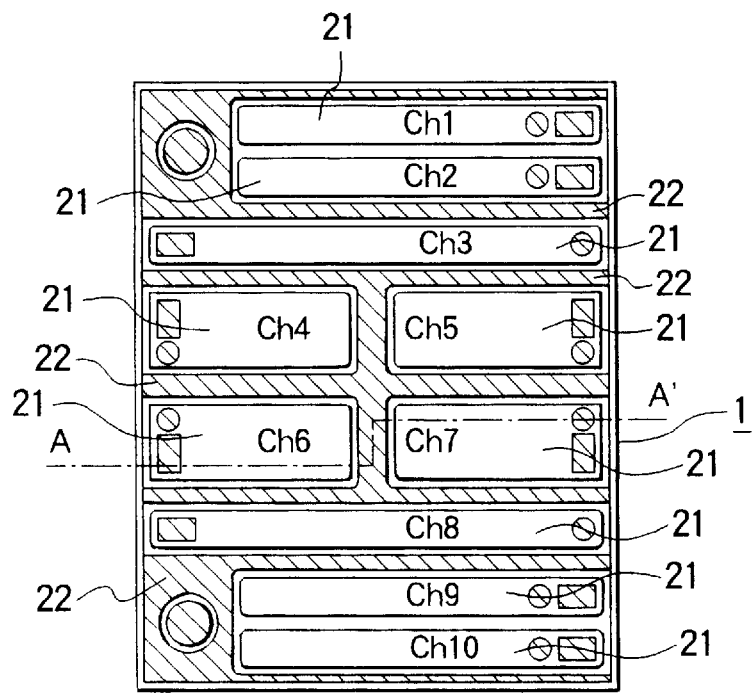
FIG. 3 is an enlarged plan view of a light receiving element of FIG. 2.
Figure 4:
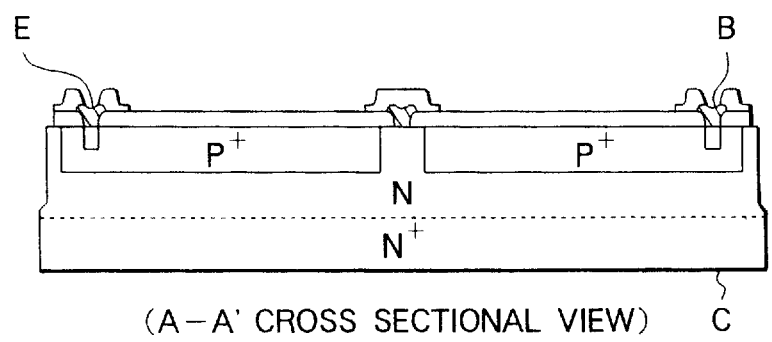
FIG. 4 is a sectional view taken on line A–A' of FIG. 3.

In FIG. 2, reference numeral 20 designates an encoder signal generating device. Further, light emitted from a light emitting element 10 is applied to a light receiving element 1 through a code portion 11a, which has slits, of a rotary code plate 11. The light receiving element 1 is constituted by a planar type phototransistor, as illustrated in FIGS. 3 and 4. Moreover, this light receiving element 1 is constituted as a one-chip. Furthermore, as illustrated in FIG. 3, there are provided 10-channel (Ch) light receiving portions 21, which are formed as a single chip and in such a manner as to be independent of one another and are respectively constituted by phototransistors (Ch1 to Ch10).

The peripheral portion of each of the aforementioned light receiving portions 21 is formed in such a way as to be nearly entirely surrounded by a light blocking portion 22 made of aluminum (incidentally, another material, for instance, chrome may be employed as the material of the light blocking portion). Further, an emitter E and a base B are formed on the top surface of the light receiving element 1. Moreover, a collector C made of copper is formed on the bottom surface of the light receiving element 1.

Figure 5:
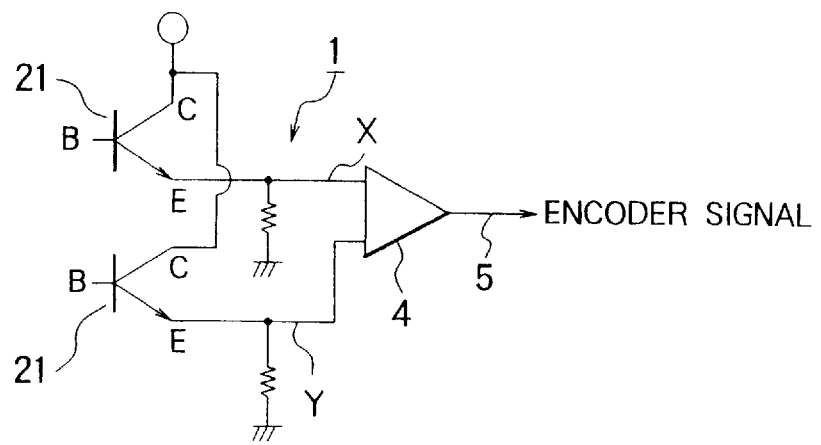
FIG. 5 is a circuit diagram illustrating the light receiving element of FIG. 2.
Figure 6:
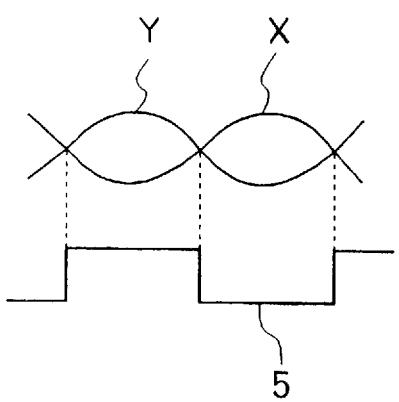
FIG. 6 is a waveform diagram showing the waveforms of signals generated in the light receiving element of FIG. 5.

As illustrated in FIG. 5, each of the light receiving portions 21 of the aforementioned light receiving element 1 is used as a two-terminal device, whose base B is open. Further, each of the light receiving portions 21 is biased in such a manner that an emitter (E) junction is biased in the forward direction and that a collector (C) junction is biased in the reverse direction. Moreover, the collectors C of the light receiving portions 21 are connected to each other. Furthermore, signals from the emitter E of each of the light receiving portions 21 are inputted to a comparison circuit 4. In addition, 2-phase output signals X and Y of FIG. 5 are outputted from the comparison circuit 4 as encoder signals 5. These encoder signals 5 are outputted as incremental and absolute encoder output signals 32 through a well-known signal processing portion 30 and an output portion 31. Incidentally, in the case where this light receiving element 1 has merely two channels (Ch), only the incremental encoder output signal 32 is outputted.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An encoder signal generating device comprising:

a light emitting element for emitting light;

a rotary code plate having a code portion which is formed thereon and represents a code;

a light receiving element for receiving light from said light emitting element, wherein light emitted from said light emitting element is applied to said light receiving element through said code portion representing the code, which is formed on said rotary code plate, wherein an encoder signal is obtained from said light receiving element, wherein said light receiving element is constituted by a one-chip planar type phototransistor that has a plurality of light receiving portions;

wherein a light blocking portion made of aluminum is formed on a periphery of each of said light receiving portions; and wherein said code portion has an absolute code section that is formed in a multi-channel manner, and wherein said light receiving element has said light receiving portions of a number which is equal to a number of channels corresponding to the absolute code section.

* * * * *